April 10, 1951 W. E. WIESENTHAL 2,548,695
MECHANICAL JACK

Filed Sept. 15, 1949 2 Sheets-Sheet 1

W. E. Wiesenthal
INVENTOR
BY C. A. Snow & Co.
ATTORNEYS.

April 10, 1951  W. E. WIESENTHAL  2,548,695
MECHANICAL JACK

Filed Sept. 15, 1949  2 Sheets-Sheet 2

W.E.Wiesenthal
INVENTOR
BY CASnow&Co.
ATTORNEYS.

Patented Apr. 10, 1951

2,548,695

UNITED STATES PATENT OFFICE 2,548,695

MECHANICAL JACK

Walter E. Wiesenthal, Wilson, Kans.

Application September 15, 1949, Serial No. 115,895

3 Claims. (Cl. 254—94)

This invention relates to a mechanical jack construction, the primary object of the invention being to provide a jack including a wheel-supported frame and elevating means on the frame for engagement under a tractor or motor vehicle to be lifted for elevating the wheels, relieving the tires of the weight of the structure when not in use, or to provide means for elevating the wheels of a tractor to permit repair of the tractor with facility.

Another object of the invention is to provide a jack construction for lifting heavy tractors or the like, wherein the hydraulic lifting arms of the tractor may be utilized to operate the jack to elevate the tractor positioned thereon.

Still another object of the invention is to provide a jack which will simultaneously lift the front and rear ends of the tractor under which the jack is positioned, relieving the tires of the tractor of the weight of the tractor.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings.

Figure 1:
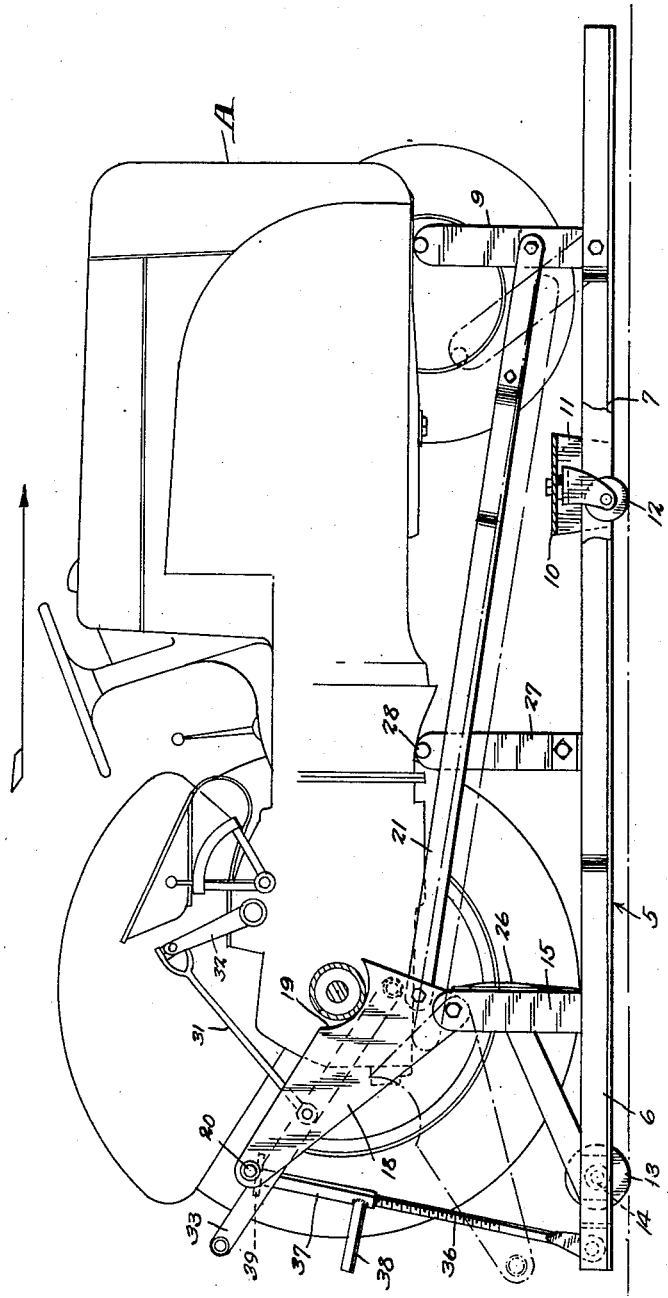
Figure 1 is a side elevational view of a jack constructed in accordance with the invention, illustrating a tractor as lifted by the jack.
Figure 2:
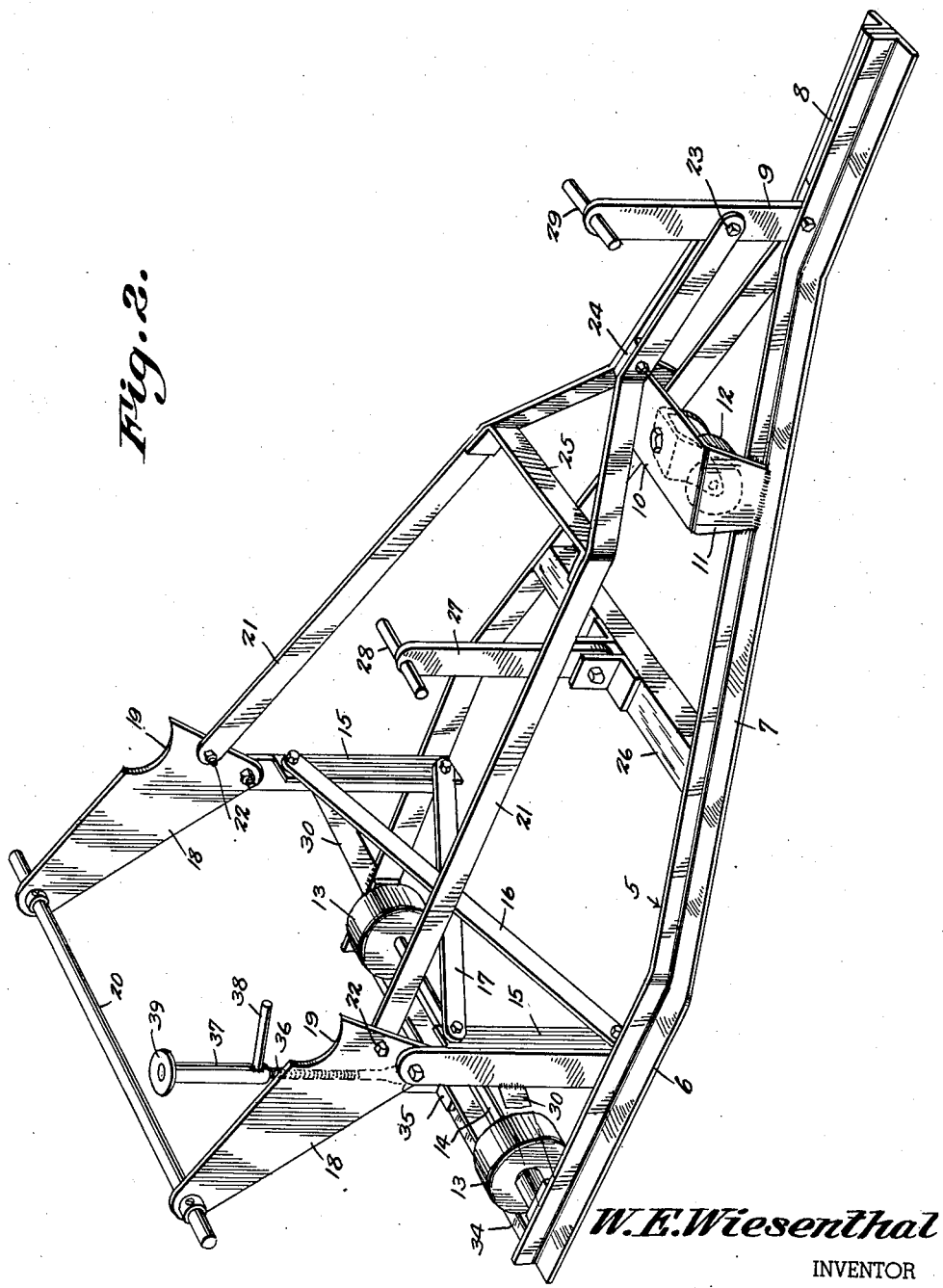
Fig. 2 is a perspective view of the jack.

Referring to the drawings in detail, the jack comprises the main frame, indicated generally by the reference character 5, the main frame embodying side bars 6 which have the forward portions thereof converging as at 7, the forward ends of the side bars being connected to the plate 8 as by welding, the plate 8 holding portions of the bars 6 spaced apart providing a clearance for the pivoted lifting arm 9, that is mounted therebetween.

Secured to the arms is the plate 10 which has downwardly extended ends 11 welded to the side bars 6, the plate 10 providing a support for the caster 12, which provides a support for the front end of the main frame of the jack. The rear end of the jack is supported by means of the wheels 13, that are mounted on the axle 14 that has its ends mounted in bearings secured to the inner surfaces of the side bars 6. Extending inwardly from the side bars 6 are vertical bars 15, which vertical bars are braced by the bars 16 and 17 that are connected to the bars 15 at the upper and lower ends of the bars 15, the bars 16 and 17 crossing each other at points intermediate their ends.

The bars 15 are constructed of angle bar material, the upper ends of one flange of the angle bar material being cut away providing clearances for the wide arms 18 which are substantially triangular in shape, the upper surfaces of the arms 18 having curved cut-out portion 19 that provides rests on which the rear axle housing of a tractor engages, during the lifting operation.

The rear ends of these arms 18 are connected by means of the rod 20 so that movement of one arm 18 will result in a relative movement of the adjacent arm 18, to insure the lifting of the tractor on an even plane.

The reference character 21 indicates connecting arms which are substantially long, the connecting arms having their rear ends pivotally connected to the arms 18, by means of the pivot bolts 22, the opposite ends of the arms 21 being pivotally connected at 23, to the pivoted lifting arm 9. The connecting arms 21 are spaced by means of the block 24, providing a clearance between the arms 21 for the pivoted lifting arm 9. The brace bar 25 is also secured between the arms 21 adjacent to the forward ends thereof, bracing the arms 21 against inward movement under operation.

Secured to the side bars 6, is a base bar 26, which not only holds the side bars 6 spaced apart, but at the same time provides a support for the pivoted holding arm 27, the arm 27 having a cross rod 28 connected thereto to engage under the tractor. The lifting arm 9 is also provided with a cross rod 29 that engages under the tractor for lifting the tractor.

In order that the vertical bars 15 will be held in upright positions, inclined base bars 30 are welded to the side bars 6 and vertical bars 15.

The reference character 21 indicates a connecting link between the arms 32 and pivoted link 33 of the tractor the arm 32 being operated by the hydraulic power unit (not shown), and which is a part of the conventional tractor.

The link 33 is adapted to swing upwardly contacting with the rod 20 elevating the outer ends of the plates 18, operating the jack.

Extending upwardly from the rear bar 34 are brackets 35 between which the threaded rod 36 is pivotally mounted, the rod 36 providing one section of the lifting jack, of which the upper movable member 37 forms a part. This member 37 is tubular and is provided with an operating handle 38 that extends therefrom so that rotary movement of the member 37 will cause it to move longitudinally of the threaded rod 36. The head 39 is swiveled on the upper end of the member 37 to engage under the rod 20 after the jack has been operated to elevate the tractor under which it is positioned, the tractor in the present showing being indicated by the reference character A. With the jack so positioned, the movable elements of the jack are held against reverse movement under the weight of the tractor lifted thereby.

I claim:

1. In a tractor jack, a wheel-supported horizontally disposed main frame, vertically swinging lifting arms mounted at the front and rear of the main frame, arms disposed longitudinally of the main frame, connecting said swinging lifting arms, a horizontal rod connecting the lifting arms at the rear of the frame, said rod being engaged by power links of a tractor being lifted by the jack, and means for securing the lifting arms in their elevated positions.

2. In a jack, a wheel-supported horizontally disposed main frame including a forward narrow end and a wide rear end, a forward pivoted lifting arm mounted on the main frame, connecting arms connected with said arm above the pivot point thereof, rear lifting arms rising from the main frame, positioned under a tractor in contact therewith, connecting arms connected with the lifting arms, means for moving the pivoted lifting arms simultaneously elevating said connecting arms, and a pivoted lifting bar mounted on the main frame intermediate the ends of the main frame for engaging the intermediate portion of a tractor resting thereon.

3. The combination with a tractor having a hydraulic power unit, of a tractor jack comprising a wheel-supported frame, a forward lifting arm and rear lifting arms pivotally mounted on the frame, connecting arms connecting the forward lifting arm and rear lifting arms, means for transmitting movement of the hydraulic power unit to the lifting arms operating the lifting arms elevating a tractor resting thereon, and a pivoted supporting arm mounted intermediate the ends of the frame for engaging the tractor lifted supporting the intermediate portion of the tractor.

WALTER E. WIESENTHAL.

REFERENCES CITED

The following references are of record in the file of this patent:

UNITED STATES PATENTS

| Number | Name | Date |
|---|---|---|
| 2,449,863 | Ross | Sept. 21, 1948 |